United States Patent Office 3,108,848
Patented Oct. 29, 1963

3,108,848
MANUFACTURE OF REGENERATED CELLULOSE STRUCTURES FROM VISCOSE IN THE PRESENCE OF MODIFIERS
Vesta Marie Easterwood, Memphis, and Arthur Maultsby Dowell, Jr., Raleigh, Tenn., assignors to The Buckeye Cellulose Corporation, Cincinnati, Ohio, a corporation of Ohio
No Drawing. Filed Apr. 17, 1961, Ser. No. 103,251
19 Claims. (Cl. 18—54)

This invention relates to new and useful improvements in the manufacture of regenerated cellulose structures, including fibres, filaments, films and like articles, by the viscose process. More particularly this invention relates to the discovery of combinations of chemical modifiers for use in the viscose process which when present at the time of coagulating the viscose enhance the physical properties of the fibers, filaments, and films resulting from the regeneration of the cellulose. The modifier combinations of this invention also contribute versatility to the conditions under which high tenacities can be developed and generally improve the operation of the spinning or casting operation.

Specifically this invention is based on the discovery of particular combinations of chemical compounds for use in viscose and in the aqueous coagulating baths of the viscose process whereby various benefits are obtained in the increased wet strength of the resulting cellulose structures, in the spinnability of the viscose, and in the allowable range of salt index for the production of high tenacity fibers and films.

It has been recognized for many years that viscose rayon's loss in strength upon wetting constituted a major fault in viscose rayon fibers and films so that many investigators have attempted to correct this deficiency.

The various chemical modifiers heretofore proposed for use in modifying the skin to core ratios of cellulose structures produced by the viscose process and thereby increasing their tenacity have been effective in increasing the conditioned or dry tenacity of fibers, filaments, or films coagulated in their presence. At the same time these modifiers have increased the wet tenacity of such structures. Applicants, however, have discovered that the use of at least one of a specific and limited group of diamines in combination with at least one polyethylene glycol results in substantial increases in the wet strength of regenerated cellulose structures over that resulting from the use of the prior art modifiers. This unexpected improvement in wet tenacity is realized while maintaining or increasing the dry tenacities obtained through the use of the most effective viscose modifiers heretofore disclosed. Applicants invite ready comparison of data by reporting conditioned tenacity (Tc) and wet tenacity (Tw) herein in units of grams per denier. Conditioned tenacities were corrected to 12% yarn moisture regain in each case while the wet tenacities were determined for saturated yarn.

It is, therefore, an object of this invention to provide for combinations of chemical modifiers which are advantageous in retaining in fibers, filaments and films the dry strength effected by previous chemical modifiers while resulting in a substantial increase in their wet strength.

It is also an object of this invention to provide for combinations of chemical modifiers which have outstanding utility in promoting the spinnability of viscose during the process whereby viscose is extruded into fibers, films and filaments.

It is a further object to provide for combinations of chemical modifiers which are capable of producing their beneficial results on the regenerated cellulose fibers, filaments, and films under a wide latitude of conditions, for example, in the salt index of the viscose at the time of spinning, in the amount of the chemical modifier combinations added, and in the temperature of the coagulating bath employed.

Further objects and advantageous features will appear from the following detailed description of the invention taken in conjunction with the examples.

The development of high strength rayons exhibiting improved dry, or conditioned, tenacities was initiated some thirty years ago with rayons having about 2.2 grams per denier conditioned tenacity as a means of expanding rayon's utility and had a first goal of the attainment of rayon exceeding 3.0 grams per denier. The initial and continuing research directed toward production of high tenacity rayon fibers was concerned with the manipulation of variables in the viscose rayon process having to do with the preparation of the viscose and the spinning of the viscose. These variables include, for example, the selection of raw material and variations in the coagulation bath composition. In this manner the conditioned tenacity of viscose rayon fibers was increased by the year 1953 to approximately 4.5 grams per denier or approximately double the tenacity of early viscose rayon fibers. One major innovation during this period was the use of stretching during coagulation of the fibers in either a one or two bath system to develop high tenacity by increasing the order of the cellulose crystallites. The addition of zinc and other ions in the coagulating bath was also innovated based upon the discovery that the addition of particular ions decreased the rapidity of cellulose regeneration to facilitate stretching.

Chemical additives such as long chain sulfonamides and quaternary ammonium sulfates were also found to improve the physical properties of high tenacity rayon. With the advent of the use of chemical modifiers a large number of chemical compounds including the aliphatic amines, disclosed in United States Patent No. 2,535,044 to Norman L. Cox, granted December 26, 1950, were shown to contribute useful properties to high tenacity rayon or its processing. The discovery of additional chemical modifiers contributing a variety of desirable attributes to viscose rayon structures has proceeded at a rapid pace.

Applicants have presently discovered that combinations of at least one diamine having at least 6 carbon atoms, wherein the nitrogen atoms are separated by at least 2 carbon atoms, wherein at least one of the nitrogen atoms is tertiary, and which exhibit solubility measured at 25° C. in a 2 normal aqueous sodium hydroxide solution to an extent exceeding about 20 grams per 100 milliliters of said 2 normal sodium hydroxide solution even after four hours of continuous evacuation under 730 millimeters of Hg vacuum at 25° C., together with at least one polyethylene glycol having molecular weights from about 400 to about 3000, preferably about 1500, possess the unique property of markedly increasing the wet tenacity of viscose fibers spun in their presence over those spun in the presence of other modifiers or combinations of modifiers known in the prior art for use in the viscose process.

Diamines useful in the practice of this invention are, for example, 1,4-diazabicyclo(2,2,2)octane, 1-methylpiperazine, and N,N,N',N'-tetramethylethylenediamine in combination with, for example, polyethylene glycol having a molecular weight of 1500. The combinations of diamines and polyethylene glycols disclosed herein are not present in the viscose process as ethylene oxide adducts of diamines, but as mixtures of the hereinbefore defined diamines and polyethylene glycols.

It is noted that for maximum effectiveness the specific diamine selected for use in combination with polyethylene glycol should possess the following properties all of which are inherent in the compounds named above, (1) stability to alkali in the concentrations present in viscose, (2) non-volatility or low volatility under the conditions used in the deaeration of viscose, (3) diffusibility from the coagulated yarn, (4) ability to complex heavy metals into soluble ions, (5) stability to sulfuric acid in the concentrations found in coagulating baths, (6) capability of acting as a weak base to buffer residual acid coagulating bath liquor remaining within the partially coagulated filaments, and (7) solubility of the compound in both the viscose and coagulating bath together with solubility of any salts formed as addition products of the compound during spinning to insure their dispersion and removal.

According to the practice of the present invention, the hereinbefore defined diamines are added to viscose of a composition suitable for use in the manufacture of high tenacity rayon in amounts of from about 0.04% to about 0.7%, preferably about 0.07%, on a nitrogen equivalent basis calculated on the weight of cellulose in the viscose (nitrogen equivalent CiV basis). The hereinbefore defined polyethylene glycols are added in amounts of from about 0.2% to about 5.0% by weight, preferably about 0.8%, calculated on the basis of the weight of cellulose in the viscose (CiV basis).

The diamine-polyethylene glycol modifier combinations of this invention are preferably added to the viscose during the step of dissolving the cellulose xanthate in the manner described more fully hereinbelow, but this method of addition is not to be construed as a limitation on the scope of the invention, and the defined diamine-polyethylene glycol modifier combinations are effective with equally beneficial results when added to viscose in any manner so as to be substantially completely mixed in the viscose prior to its spinning. Also the polyethylene glycol may be added to the viscose which is then spun into an aqueous coagulating bath containing one of the diamines herein disclosed to result in the advantages of the invention. It is further specifically disclosed that, although the examples are directed to individual diamine-polyethylene glycol combinations, mixtures of the individual diamines and the polyethylene glycols of this invention can be made, within the limitations of total amounts of each added as stated above, to result in the improvements in viscose rayon articles disclosed herein. It is also specifically disclosed that the diamines of this invention may be introduced at levels of 100–400 milligrams per liter into the coagulating bath used to coagulate viscose containing polyethylene glycol together with amine modifiers other than those of the present invention to result in the herein disclosed improvements to the finished viscose rayon yarns and films.

It will be understood that the herein disclosed improvements in the wet strength of viscose rayon films and fibers and in the operation of the coagulating equipment associated with viscose rayon manufacture are dependent upon the presence of the above mentioned quantities of the chemical compounds of this invention during coagulation, and are not solely dependent on a particular composition of viscose, composition of coagulating bath, or combinations thereof.

However, to indicate more fully the nature of the present invention, in the preferred practice thereof a viscose is prepared from high alpha wood or cotton linter chemical pulp in the following manner. The wood or cotton linter pulp is steeped in about 18% sodium hydroxide containing less than about 0.5% hemicellulose for one hour at room temperature, thereafter the excess sodium hydroxide is drained off the pulp and the alkali cellulose is pressed to a press weight ratio of about 2.6, i.e., the weight of the pressed alkali cellulose is about 2.6 times the weight of the initial cellulose pulp. The alkali cellulose is then shredded for 40 minutes, and the alkali cellulose crumbs are aged for about 21 hours at about 31.5° C. Following aging the alkali cellulose is placed in a barette where xanthation is carried out over a period of about 100 minutes at about 29° C. by slowly adding an amount of carbon bisulfide equivalent to about 34% of the weight of cellulose present. The cellulose xanthate formed is then dissolved in about the amount of 4.5% sodium hydroxide cooled to 11° C. necessary to result in a viscose containing about 6.5% cellulose and about 6.0% sodium hydroxide. Prior to adding the cellulose xanthate, about 0.77% on a cellulose weight basis of polyethylene glycol having a molecular weight of about 1500 is added to the sodium hydroxide solution used to dissolve the cellulose xanthate, although any amount between about 0.2% to 5.0% may be added according to the invention.

After adding the cellulose xanthate to the sodium hydroxide containing the polyethylene glycol, the mass is stirred for about 30 minutes and about 8.23% on a CiV basis of carbon disulfide is added. At this time between about 0.04% and about 0.7%, preferably 0.07%, of 1,4-diazabicyclo(2,2,2)octane is added on a nitrogen equivalent CiV basis. It is understood that the diamine can be selected from any of the hereinbefore defined diamines and that the addition can be made at any time or in any order during the dissolving which allows for substantially complete mixing to take place. The diamine selected can also be incorporated in the viscose after the dissolving step by stirring to effect mixing, although the addition during mixing is obviously more convenient.

The viscose is mixed for a total time of about 90 minutes during which time the temperature is not allowed to exceed about 12° C.

Following the normal steps of filtration and deaeration in the viscose process and prior to spinning, the viscose is ripened at about 17° C. to about 18° C. to a salt index of about 13 to about 19, and preferably about 18 units. Salt index units here, as well as elsewhere in this application, are given as the sodium chloride salt index.

The resulting ripened viscose is spun into an aqueous spin bath containing about 85 grams per liter of sulphuric acid, about 85 grams per liter of zinc sulfate, and about 121 grams per liter of sodium sulfate at a temperature of about 56° C.

The extruded filaments are submerged thru a spin bath travel distance of about 30 inches to about 40 inches. The filaments are then withdrawn from the first spin bath and wrapped around a ceramic godet for three turns, a distance of about 170 inches. Coming from the godet, the filaments are passed through a second aqueous strong acid bath containing about 30 grams per liter of sulphuric acid and maintained at about 95° C. where a stretch of about 95% to about 109% is applied.

The resulting yarn is washed, treated with any of the finishing agents known to the art, dried, and wound on a cone at the rate of about 50 meters per minute. The tested yarns referred to herein also received a "Z" or "S" twist of 3.1 turns per inch prior to testing.

It is understood that the foregoing general description of the preferred practice of the present invention is not to be considered restrictive and that other viscose compositions and coagulating baths known in the viscose art may be used together with the herein disclosed chemical modifier combinations to result in improved viscose rayon according to the invention. Each repetitive test of yarns so processed exhibited the unexpected increase in wet strength which is characteristic of the diamine-polyethylene glycol combinations of this invention.

In the following examples there are illustrated preferred embodiments of this invention together with comparisons of the results stemming from the use of diamines and polyethylene glycol separately and those stemming from the use of the dimethylamine-polyethylene glycol modifier combination of the prior art, but it is understood that the examples are not to be construed as limiting the scope of the invention.

EXAMPLE I

Viscose was prepared having a cellulose content of 6.5%, an alkalinity of 6.0%, and a sulfur content of 2.3% using a total of 42% carbon bisulfide on a CiV basis. To individual portions of this viscose was added one of the diamines, 1,4-diazabicyclo(2,2,2)octane, 1-methylpiperazine, and N,N,N',N'-tetramethylethylenediamine, together with polyethylene glycol having a molecular weight of approximately 1500 in quantities of about 0.07% on a nitrogen equivalent CiV basis and 0.77% CiV basis respectively. The viscose was then aged to a salt index of 18 units and spun thru a 980 filament spinnerette into an aqueous coagulating bath containing 85 grams per liter of sulphuric acid, 85 grams per liter of zinc sulphate, and 121 grams per liter of sodium sulphate to give an 1100 denier yarn. The coagulating bath was maintained at 56° C., the bath travel was approximately 35 inches, and the filaments were given a 102% stretch in a second aqueous regenerating bath containing 30 grams per liter of sulphuric acid and maintained at 95° C. The resulting yarn was washed, treated with an aqueous finishing bath containing 3.5% of a finishing oil (Stantex 1246), dried, and wound on a cone at the rate of 50 meters per minute. The yarn received a twist of 3.1 turns per inch prior to testing.

Table I below gives the conditioned and wet tenacities of the yarns prepared, and for the purposes of comparison also tabulates the results for yarns spun from the same viscose under identical conditions with nitrogen compounds alone, with polyethylene glycol alone and with polyethylene glycol together with amines other than those of the present invention.

*Table I*

COMPARISON OF YARN TENACITIES USING VARIOUS MODIFIERS

| Modifier in viscose | Conditioned Tenacity (Tc) | Wet Tenacity (Tw) | Improvement in (Tw) over Blank (Tw), grams/denier |
|---|---|---|---|
| 1,4-diazabicyclo (2,2,2,) octane and polyethylene glycol | 5.33 | 3.66 | 1.11 |
| 1-methylpiperazine and polyethylene glycol | 5.42 | 3.65 | 1.10 |
| N,N,N'N'-tetramethylethylene-diamine and polyethylene glycol | 5.29 | 3.64 | 1.09 |
| Dimethylamine and polyethylene glycol | 5.16 | 3.27 | 0.72 |
| 1,4-diazabicyclo (2,2,2) octane (no polyethylene glycol) | 4.44 | 2.50 | −0.05 |
| 1-methylpiperazine (no polyethylene glycol) | 4.38 | 2.48 | −0.07 |
| N,N,N'N'-tetramethylethylene-diamine (no polyethylene glycol) | 4.80 | 2.95 | 0.40 |
| Dimethylamine (no polyethylene glycol) | 4.20 | 2.22 | −0.33 |
| Polyethylene glycol (no amine) | 5.25 | 3.38 | 0.83 |
| Blank (no modifier) | 4.62 | 2.55 | |

As may be readily calculated from the tabulated data above, the diamines of the present invention in combination with polyethylene glycol not only result in improved conditioned tenacities over those obtained with the dimethylamine-polyethylene glycol combination when tested under identical conditions, but unexpectedly promote a greatly increased wet tenacity as well. From the data presented, the improvement in Tw over the blank exhibited by the yarn spun in the presence of the diamine-polyethylene glycol combinations of this invention is calculated to average 1.10 grams per denier. In the same comparison yarn spun in the presence of polyethylene glycol alone shows an improvement of only 0.83 gram per denier, while yarn spun in the presence of the dimethylamine-polyethylene glycol combination exhibits an improvement of only 0.72 gram per denier. By dividing the former improvement by the latter improvements, it is seen that the improvement attributable to the diamine-polyethylene glycol combinations of this invention is respectively 132.5% and 152.7% of the improvement effected by the polyethylene glycol alone or the dimethylamine-polyethylene glycol combination. This increase in wet tenacity represents a significant advance in the art by breaking thru a "ceiling" on the wet strengths attainable in rayon fibers while maintaining or slightly increasing the conditioned strength. The advance in the art is all the more significant because of the heretofore stated intensive effort applied to this problem beginning about thirty years ago.

EXAMPLE II

Viscose, prepared in the manner of Example I and containing 0.07% on a nitrogen equivalent CiV basis of 1,4-diazabicyclo(2,2,2)octane together with 0.77% on a CiV basis of polyethylene glycol having a molecular weight of 1500, was spun under various conditions of bath travel and stretch.

*Table II*

EFFECT OF BATH TRAVEL DISTANCE AND STRETCH ON YARN PROPERTIES OF VISCOSE RAYON YARN

| Bath travel (inches) | 30 | | | | 40 | | | | | |
|---|---|---|---|---|---|---|---|---|---|---|
| Percent stretch | 102 | | 109 | | 95 | | 102 | | 109 | |
| Spin bath temp., °C. | Tc | Tw | Tc | Tw | Tc | Tw | Tc | Tw | Tc | Tw |
| 53 | 5.31 | 3.44 | 5.42 | 3.58 | | | 5.40 | 3.63 | 5.46 | 3.65 |
| 56 | 5.26 | 3.62 | 5.34 | 3.69 | 5.21 | 3.52 | 5.33 | 3.72 | 5.46 | 3.77 |
| 58 | 5.17 | 3.63 | 5.26 | 3.74 | | | 5.41 | 3.64 | 5.42 | 3.70 |
| 60 | 5.28 | 3.62 | 5.26 | 3.67 | 5.23 | 3.56 | 5.27 | 3.67 | 5.25 | 3.81 |

The data of Table II above illustrate some of the widely varying conditions of bath travel, stretch percentage, and temperature under which the advantageous increase of wet strength will occur using one of the modifier combinations of the present invention and similar results can be obtained by using chemical modifier combinations such as 1-methylpiperazine together with a polyethylene glycol having a molecular weight of 900 or N,N,N',N'-tetramethylethylenediamine together with a polyethylene glycol having a molecular weight of 2700 and other chemical modifier combinations within the scope of the invention.

EXAMPLE III

In order to show the effect of various levels of 1,4-diazabicyclo(2,2,2)octane in viscose, samples of viscose were prepared and spun containing 0.77% polyethylene glycol as before, but with the 1,4-diazabicyclo(2,2,2)-octane levels shown in Table III below.

*Table III*

EFFECT OF 1,4-DIAZABICYCLO(2,2,2)OCTANE LEVEL ON YARN PROPERTIES

| Nitrogen equivalent CiV of 1,4-diazabicyclo (2,2,2) octane, percent | Yarn Properties | |
|---|---|---|
| | Tc | Tw |
| 0.04 | 5.21 | 3.43 |
| 0.07 | 5.36 | 3.72 |
| 0.12 | 5.22 | 3.72 |
| 0.15 | 5.16 | 3.62 |
| 0.24 | 5.15 | 3.55 |
| 0.73 | 5.10 | 3.45 |

These results demonstrate the remarkable tolerance of the 1,4-diazabicyclo(2,2,2)octane-polyethylene glycol modifier combination in regard to the amount of diamine employed, and similar results are obtained using the other diamines within the scope of the present invention. Similar improvements in the wet tenacity of viscose rayon will be obtained when polyethylene glycols having molecular weights of from about 400 to about 3000 are employed at levels of from about 0.2% to about 5.0% on a CiV basis together with other diamines within the scope of this invention within the amounts specified for 1,4-diazabicyclo(2,2,2)octane in Table III above.

EXAMPLE IV

In order to more fully demonstrate the advantage of the modifier combinations of the present invention viscoses were prepared and spun in the same manner as Example I, using 1,4-diazabicyclo(2,2,2)octane and polyethylene glycol, but given a stretch of 109%. These viscoses were spun into coagulating baths of the composition used in Example I, but the successive spins were made with the aqueous coagulating bath maintained at different temperatures with the results tabulated in Table IV below:

*Table IV*

EFFECT OF SPIN BATH TEMPERATURE

| Spin Bath Temp., °C. | Tenacities | |
|---|---|---|
| | (Tc) | (Tw) |
| 51±1° | 5.20 | 3.53 |
| 56±1° | 5.41 | 3.75 |
| 59±1° | 5.38 | 3.71 |

The data of Table IV show the effectiveness of the 1,4-diazabicyclo(2,2,2)octane-polyethylene glycol combination in producing high wet strengths when viscose containing the combination is spun into aqueous coagulating baths maintained at 50° C. to 60° C. Similar results can be obtained with the other diamine-polyethylene glycol combinations within the scope of this invention, for example, 1-methylpiperazine together with a polyethylene glycol having a molecular weight of 2800 or N,N,N',N'-tetramethylethylenediamine together with a polyethylene glycol having a molecular weight of 400, with spinbath temperatures up to about 65° C.

EXAMPLE V

In order to demonstrate the tolerance of the diamine-polyethylene glycol combinations of the present invention to variations in the salt index at which the viscose is spun, viscoses were prepared in the manner of Example I using 1,4-diazabicyclo(2,2,2)octane, but with the spin bath temperature maintained as noted in Table V below. These viscoses were spun at the salt indexes and with the results tabulated below:

*Table V*

EFFECT OF SALT INDEX ON YARN PROPERTIES

| Spinbath Temperature, °C., 53±1 | | Spinbath Temperature, °C., 58±1 | |
|---|---|---|---|
| Salt Index | Tc | Salt Index | Tc |
| 11.25 | 4.67 | | |
| 11.50 | 4.72 | | |
| | | 11.75 | 5.19 |
| 12.25 | 5.04 | | |
| 13.00 | 5.22 | | |
| 13.50 | 5.39 | 13.50 | 5.28 |
| 14.00 | 5.27 | | |
| 15.00 | 5.36 | | |
| | | 15.25 | 5.15 |
| | | 17.50 | 5.70 |
| 18.00 | 5.46 | | |

These data demonstrate the ability of the 1,4-diazabicyclo(2,2,2)octane-polyethylene glycol modifier combinations of this invention to result in yarns having conditioned tenacities in excess of 5.0 grams per denier when viscoses to which they have been added are spun at salt indexes as low as 11.75. Viscoses containing the other diamine-polyethylene glycol combinations of this invention, such as 1-methylpiperazine together with a polyethylene glycol having a molecular weight of 600 or N,N,N',N'-tetramethylethylenediamine together with a polyethylene glycol having a molecular weight of 3000, will produce yarns having similar high tenacities when spun at low salt indexes.

EXAMPLE VI

In order to demonstrate the effectiveness of adding the diamines, alone, of this invention to aqueous coagulation baths in improving the results obtained in spinning viscoses containing polyethylene glycol together with amine modifiers not within the scope of this invention or polyethylene glycol alone, a viscose prepared in the manner of Example I, but containing dimethylamine in the amount of approximately 0.05% nitrogen equivalent CiV and polyethylene glycol having a molecular weight of approximately 1500 in the amount of approximately 0.8% CiV was spun into a coagulating bath containing about 200 milligrams per liter of 1,4-diazabicyclo(2,2,2)octane. The bath travel was 30 inches and the yarn was given a stretch of 102%. It will be understood that in this example, as in all cases within the scope of this invention, the aqueous coagulating bath will contain by addition from the viscose spun, or is adjusted to, an equilibrium amount of the polyethylene glycol present in the viscose. The spinning operation was repeated at different bath temperatures and with polyethylene glycol alone being added to the viscose, with the results tabulated below:

*Table VI*

EFFECT OF SPINNING AMINE-POLYETHYLENE GLYCOL COMBINATIONS WITHOUT THE SCOPE OF THE PRESENT INVENTION INTO A COAGULATING BATH CONTAINING SUBSTANTIAL AMOUNTS OF 1,4-DIAZABICYCLO(2,2,2)OCTANE

| Coagulating bath temp., °C. | | 56±1 | | 59±1 | |
|---|---|---|---|---|---|
| Viscose Modifier | Coagulating bath modifier added | Tc | Tw | Tc | Tw |
| polyethylene glycol | None | 5.25 | 3.31 | 5.41 | 3.54 |
| Do | 1,4-diazabicyclo-(2,2,2)octane. | 5.36 | 3.71 | 5.45 | 3.70 |
| dimethylamine - polyethylene glycol. | None | 5.03 | 3.24 | 5.26 | 3.55 |
| Do | 1,4-diazabicyclo-(2,2,2)octane. | 5.41 | 3.63 | 5.56 | 3.72 |

The results clearly illustrate the increase in both wet and dry strength, or tenacity, obtained by spinning the viscose containing dimethylamine-polyethylene glycol as a modifier into a coagulating bath containing a substantial amount of 1,4-diazabicyclo(2,2,2)octane and similar results are obtained by substituting the other diamines of this invention for the 1,4-diazabicyclo(2,2,2)octane in the coagulating bath. Similarly the diamines of this invention employed in the coagulating bath will improve the physical characteristics of yarns spun from viscoses containing other amine-polyethylene glycol combinations or polyethylene glycol alone.

The following table gives solubilities for the various diamines used in the examples in 2 normal sodium hydroxide in terms of grams solubility in 100 cubic centimeters of aqueous sodium hydroxide solution at 25° C. at equilibrium conditions and after four hours of continuous evacuation under 730 millimeters of Hg vacuum at 25° C.

The solubilities which are not true saturated solubilities but saturated solubilities reduced by the hereinbelow described evacuation treatment corresponding to the deaeration treatment given viscose prior to spinning, were determined by adding 5 milliliters of 2 normal sodium hydroxide to a tared beaker which was then weighed. The diamine whose solubility was to be determined was added in small portions until the first permanent turbidity appeared. The open beaker was then placed in a desiccator maintained at 25° C. and under a vacuum, produced by a water aspirator, of 730 millimeters of Hg for 4 continuous hours. The evacuated sample was titrated to a pH of 7 with 0.5 normal sulphuric acid for sodium hydroxide and then to the equivalence point of the determined diamine. The results were calculated in terms of grams of diamine soluble in 100 cubic centimeters of 2 normal aqueous sodium hydroxide solution as reported below.

*Table VII*

EVACUATED SOLUBILITY OF DIAMINES

| Diamine: | Evacuated solubility, g./100 cc. |
|---|---|
| 1,4-diazabicyclo(2,2,2)octane | 49.0 |
| 1-methylpiperazine | 47.6 |
| N,N,N',N'-tetramethylethylenediamine | 20.1 |

In addition to the advantages demonstrated by the foregoing examples, the diamine-polyethylene glycol combinations of this invention have demonstrated excellent characteristics in the prevention of undesirable effects in the spinning of viscose such as difficulty in "spinning in," that is, initiating the coagulation of the viscose filaments at the spinnerette. Furthermore, spinnerette incrustation leading to slubbed yarn, eventual clogging of the spinnerette holes and breakdown of the spinning train is held to a minimum thru the use of the present diamine-polyethylene glycol modifier combinations.

While specific examples of methods and products embodying the present invention have been described above, it will be apparent that many changes and modifications may be made in the methods of procedure and the products without departing from the spirit of the invention. It will therefore be understood that the examples cited and the methods and procedures set forth above are intended to be illustrative only and are not intended to limit the invention.

What is claimed is:

1. An improved process for the manufacture of regenerated cellulose structures, including filaments and films, by the viscose process which comprises coagulating viscose in the presence of from about 0.04% to about 0.7% on a nitrogen equivalent basis, calculated on the weight of cellulose in the viscose, of at least one diamine having at least 6 carbon atoms, wherein the nitrogen atoms are separated by at least 2 carbon atoms, wherein at least one of the amine groups is tertiary, and which exhibit solubility measured at 25° C. in a 2 normal aqueous sodium hydroxide solution to an extent exceeding about 20 grams per 100 milliliters of said 2 normal sodium hydroxide solution even after 4 hours of continuous evacuation under 730 millimeters of Hg vacuum at 25° C., together with from about 0.2% to about 5.0% calculated on the basis of the weight of cellulose in the viscose of at least one polyethylene glycol having a molecular weight from about 400 to about 3000.

2. The improved process for the manufacture of regenerated cellulose structures, including filaments and films, by the viscose process of claim 1 wherein about 0.07% of the diamine is added to the viscose on a nitrogen equivalent basis, calculated on the weight of cellulose in the viscose, in combination with about 0.8% of the polyethylene glycol calculated on the basis of the weight of cellulose in the viscose.

3. An improved process for the manufacture of regenerated cellulose structures, including filaments and films, by the viscose process which comprises coagulating viscose in an aqueous coagulating bath in the presence of from about 0.04% to about 0.7% on a nitrogen equivalent basis, calculated on the weight of cellulose in the viscose, of a diamine selected from the group consisting of 1,4-diazabicyclo(2,2,2)octane, 1-methylpiperazine, and N,N,N',N'-tetramethylethylenediamine together with from about 0.2% to about 5.0% calculated on the basis of the cellulose in the viscose of a polyethylene glycol having a molecular weight from about 400 to about 3000.

4. The improved process for the manufacture of regenerated cellulose structures by the viscose process of claim 3 wherein the polyethylene glycol has a molecular weight of about 1500.

5. The improved process for the manufacture of regenerated cellulose structures by the viscose process of claim 3 wherein the diamine and polyethylene glycol are added to the viscose at any time prior to spinning.

6. The improved process for the manufacture of regenerated cellulose structures by the viscose process of claim 3 wherein the salt index of the viscose at the time of spinning is between about 11 and about 18.

7. The improved process for the manufacture of regenerated cellulose structures by the viscose process of claim 3 wherein the bath travel of the coagulated viscose is from about 30 to about 40 inches.

8. The improved process for the manufacture of regenerated cellulose structures by the viscose process of claim 3 wherein the stretch given to the coagulated viscose is between about 95% and about 109%.

9. The improved process for the manufacture of regenerated cellulose structures by the viscose process of claim 3 wherein the temperature of the aqueous coagulating bath employed in the coagulation of the viscose is between about 50° C. and about 65° C.

10. The improved process for the manufacture of regenerated cellulose structures by the viscose process of claim 3 wherein the polyethylene glycol is incorporated in the viscose and the diamine is present in the aqueous coagulating bath in amounts of from about 100 to about 400 milligrams per liter.

References Cited in the file of this patent

UNITED STATES PATENTS

| 2,910,341 | Cox et al. | Oct. 27, 1959 |
| 2,942,931 | Mitchell et al. | June 28, 1960 |

FOREIGN PATENTS

| 1,023,559 | Germany | Jan. 30, 1958 |